UNITED STATES PATENT OFFICE.

WALTER BAUER, OF DARMSTADT, GERMANY, ASSIGNOR TO THE FIRM RÖHM & HAAS AKTIENGESELLSCHAFT, OF DARMSTADT (FREE STATE OF HESSIA), GERMANY.

METHOD OF PRODUCING CHEMICAL COMPOUNDS FROM ACETYLENE AND HYDROHALOGENIC ACIDS.

1,414,852. Specification of Letters Patent. Patented May 2, 1922.

No Drawing. Application filed September 1, 1921. Serial No. 497,671.

*To all whom it may concern:*

Be it known that I, WALTER BAUER, a citizen of the Free State of Schwarzburg-Sondershausen, in the German Republic, residing at Darmstadt, in the Free State of Hessia, Germany, have invented Improvements in Methods of Producing Chemical Compounds from Acetylene and Hydrohalogenic Acids, (for which I have made application in Germany July 23, 1919;) and I do hereby declare the following to be a full, clear, and exact description of the same.

It is known, that addition products are formed by treating hydrohalogenic acids such as hydrobromic acid, with acetylene. The addition has been carried out first by treating strong aqueous solutions of acids of the kind with acetylene (see Comptes rendus, vol. 74, page 948, Zeitschrift für Chemie, 1865, page 725, Chemische Industrie, vol. 18, pages 227 and 454 and seq., Liebig's Annalen, vol. 132, pages 122 and 123). The reaction products thereby obtained were vinyl- and ethylidene-compounds. This addition however, proceeds very slowly and stops altogether as soon as a small portion of the hydrohalogenic acid has been consumed by the reaction.

But the reaction did not become practically or commercially important prior to the suggestion of carrying out the process in presence of catalytic agents, as set out in the German patent specifications 278249 and 288584. In the references acetylene is employed either in a gaseous state or dissolved in water. The reaction products obtained in this case are also vinyl- and ethylidene-compounds.

It has been found that the addition of hydrohalogenic acids to acetylene can be brought about with a more satisfactory result by causing natural or artificial light to act on a mixture of the two gaseous substances. The reaction is favorably influenced particularly by rays of short wave length, such as produced by a quartz lamp. This is the more surprising as acetylene and its reaction products, judging from the hitherto prevailing state of knowledges, are converted into polymeric bodies by the action of short waved rays, and the reaction products could not be expected to be isolated or separated.

Further it has been found, that the addition of the hydrohalogenic acid takes place symmetrically under the action of light, so that besides vinyl-compounds also ethylene compounds and no ethylidene compounds can be obtained. This is an essential difference and advance over both the two above cited methods and all inherent facts that have become known hitherto in the scientific literature, see Hans Meyer, Analyse und Konstitutionsermittelung Organischer Verbindungen, 3d edition, 1916, page 971, and Vogel, Acetylene, 1911, page 26.

The present invention opens a new and important way for the practical utilization of acetylene. By mixing about equal parts of volume of acetylene and an hydrohalogenic acid vinylhalides can be produced. In using acetylene and about a double quantity of the acid symmetrical addition products can be obtained.

Example 1.

1.5 parts (by volume) of acetylene and 1 part (by volume) of hydrobromic acid are slowly introduced into a reaction vessel of 1 m$^3$ capacity in a manner, that only 250 l. of the mixture of the two gases enter the vessel within one hour, and the vessel is exposed to the action of the sun-light, artificial light or diffused day-light, whereupon vapors develop in the vessel which tend to condense on the walls of the vessel. If the temperature of the vessel is kept low, that is near the freezing point (0° C.), vinylbromide is obtained to the amount of 80% of what theoretically might be obtainable from the quantity of hydrobromic acid employed.

Example 2.

A mixture consisting of 1 part acetylene and 2.1 parts hydrobromic acid is introduced into a similar vessel as before. The ethylenebromide condensed on the walls of the vessel and vessel flows to the bottom of the vessel and can be drawn off in an almost pure state. The acetylene employed is fully or quantitatively converted into ethylenebromide. The excess of hydrobromic acid is regained.

Having now described and ascertained the nature of my invention and in which the same is to be performed I now declare what I claim and desire to secure by Letters Patent of the United States:

1. A method of producing hydrohalogenic acid addition products of acetylene consisting in exposing a mixture of acetylene and a hydrohalogenic acid to the action of light.

2. A method of producing hydrohalogenic acid addition products of acetylene, consisting in exposing a mixture of about equal parts of volume of acetylene and a hydrohalogenic acid to the action of light.

3. A method of producing symmetrical hydrohalogenic addition products of acetylene, consisting in exposing a mixture of acetylene and a hydrohalogenic acid in the proportion of about 1 to 2 by volume to the action of light.

In testimony whereof, I have signed my name to this specification in the presence of two subscribing witnesses.

WALTER BAUER.

Witnesses:
HEINRICH FEUERBACH,
MOSES GLÜCK.